(12) United States Patent
Elshafie et al.

(10) Patent No.: US 11,882,586 B2
(45) Date of Patent: Jan. 23, 2024

(54) PHYSICAL DOWNLINK SHARED CHANNEL (PDSCH) BASED CHANNEL STATE INFORMATION (CSI)

(71) Applicant: QUALCOMM Incorporated, San Diego, CA (US)

(72) Inventors: Ahmed Elshafie, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/453,990

(22) Filed: Nov. 8, 2021

(65) Prior Publication Data

US 2023/0141011 A1 May 11, 2023

(51) Int. Cl.
*H04W 72/542* (2023.01)
*H04W 72/0446* (2023.01)
*H04W 72/1273* (2023.01)
*H04L 1/00* (2006.01)
*H04L 1/1812* (2023.01)
*H04L 5/14* (2006.01)
*H04L 5/00* (2006.01)

(52) U.S. Cl.
CPC ......... *H04W 72/542* (2023.01); *H04L 1/0003* (2013.01); *H04L 1/0026* (2013.01); *H04L 1/1812* (2013.01); *H04L 5/0051* (2013.01); *H04L 5/0053* (2013.01); *H04L 5/14* (2013.01); *H04W 72/0446* (2013.01); *H04W 72/1273* (2013.01)

(58) Field of Classification Search
CPC ........... H04W 72/542; H04W 72/0466; H04W 72/1273; H04L 1/0003; H04L 1/0026; H04L 1/1812; H04L 5/0051; H04L 5/0053; H04L 5/14
See application file for complete search history.

(56) References Cited

U.S. PATENT DOCUMENTS

| | | | |
|---|---|---|---|
| 2019/0222462 A1* | 7/2019 | Nammi | H04L 1/0016 |
| 2019/0349121 A1* | 11/2019 | Tian | H04L 1/1671 |
| 2020/0112357 A1 | 4/2020 | Fakoorian et al. | |
| 2020/0259625 A1* | 8/2020 | Papasakellariou | H04B 7/0626 |
| 2022/0070711 A1* | 3/2022 | Elshafie | H04L 5/0057 |

(Continued)

FOREIGN PATENT DOCUMENTS

| | | |
|---|---|---|
| WO | 2020248218 A1 | 12/2020 |
| WO | 2021163162 A1 | 8/2021 |

OTHER PUBLICATIONS

International Search Report and Written Opinion—PCT/US2022/078123—ISA/EPO—dated Jan. 23, 2023.

*Primary Examiner* — Kent Krueger
(74) *Attorney, Agent, or Firm* — Patterson + Sheridan, L.L.P.

(57) ABSTRACT

Certain aspects of the present disclosure provide techniques for wireless communication by a user equipment (UE). For example, the UE receives a physical downlink shared channel (PDSCH) channel state information (CSI) report configuration from a network entity. The UE monitors a PDSCH transmission. The UE generates and transmits a CSI report to the network entity, based on the monitoring and in accordance with the PDSCH CSI report configuration.

25 Claims, 9 Drawing Sheets

(56) References Cited

U.S. PATENT DOCUMENTS

| | | | |
|---|---|---|---|
| 2022/0322126 A1* | 10/2022 | Yang | H04L 5/0094 |
| 2023/0097142 A1* | 3/2023 | Alfarhan | H04L 5/0051 |
| | | | 370/329 |

\* cited by examiner

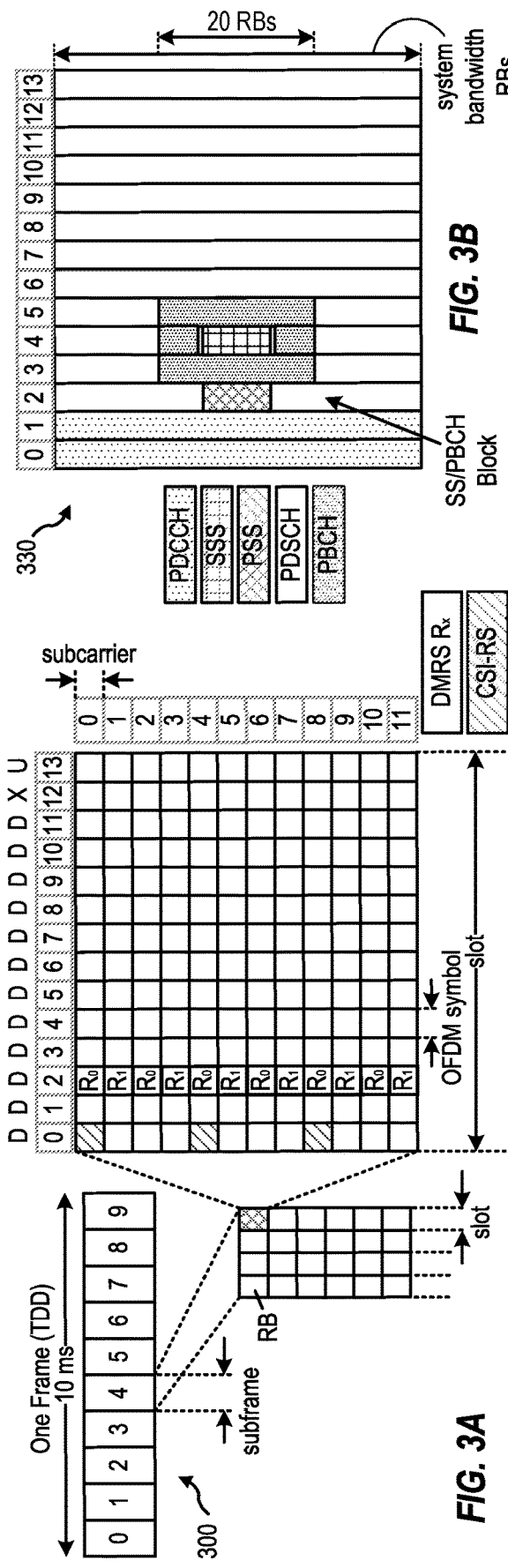
FIG. 3A
FIG. 3B
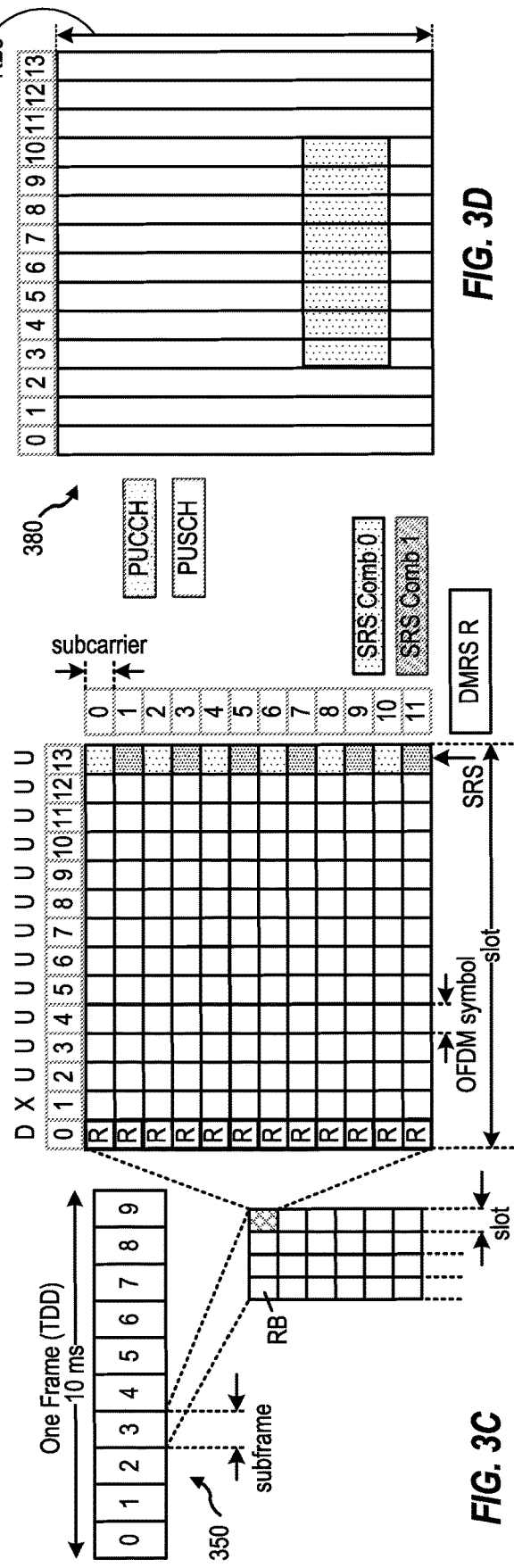
FIG. 3C
FIG. 3D

```
                    ┌─────────────────────────────────────────────────┐
                    │   A method for wireless communication by a network entity   │
                    └─────────────────────────────────────────────────┘
                                              │
                                              ▼                                    ┌─ 510
    ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
    │ Transmitting, to a user equipment (UE), a plurality of physical downlink shared │
    │     channel (PDSCH) channel state information (CSI) report configurations      │
    └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
```

Flowchart 500:

- 510: Transmitting, to a user equipment (UE), a plurality of physical downlink shared channel (PDSCH) channel state information (CSI) report configurations
- 520: Transmitting, to the UE, an indication indicating a PDSCH CSI report configuration from the plurality of PDSCH CSI report configurations
- 530: Transmitting, to the UE, a PDSCH transmission
- 540: Receiving, from the UE, a CSI report based on the PDSCH transmission and in accordance with the PDSCH CSI report configuration

FIG. 5

PHYSICAL DOWNLINK SHARED CHANNEL (PDSCH) BASED CHANNEL STATE INFORMATION (CSI)

INTRODUCTION

Aspects of the present disclosure relate to wireless communications, and more particularly, to techniques for channel state information (CSI) reports.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE), comprising: receiving, from a network entity, a physical downlink shared channel (PDSCH) channel state information (CSI) report configuration; monitoring a PDSCH transmission; and transmitting, to the network entity, a CSI report based on the monitoring and in accordance with the PDSCH CSI report configuration.

Another aspect provides a method for wireless communication by a network entity, comprising: transmitting, to a UE, a PDSCH CSI report configuration; transmitting, to the UE, a PDSCH transmission; and receiving, from the UE, a CSI report based on the PDSCH transmission and in accordance with the PDSCH CSI report configuration.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 5 is a flow diagram illustrating example operations for wireless communication by a network entity.

DETAILED DESCRIPTION

Aspects of the present disclosure provide apparatuses, methods, processing systems, and computer-readable mediums for generating physical downlink shared channel (PDSCH)-based channel state information (CSI) reports (also referred to herein as "PDSCH CSI reports"). A PDSCH-based CSI report may refer to a channel state feedback (CSF) report sent from a user equipment (UE) to a base station (BS), where the CSF report includes one or more feedback parameters based on measurements by the UE of one or more PDSCH transmissions from the BS.

For example, techniques described herein relate to a report configuration for PDSCH-based CSI reporting. In some aspects, the PDSCH-based CSI report configuration is based on whether full duplex and/or half duplex (FD/HD) are configured. The techniques described herein provide for PDSCH-based CSI reporting for overlapping PDSCH transmissions. According to certain aspects, PDSCH-based CSI reports may be compressed across multiple PDSCH transmissions. According to certain aspects, overlapping and non-overlapping resources may be separately reported. A network entity may use a PDSCH-based CSI report from a user equipment (UE) to improve data transmission to the UE.

Introduction to Wireless Communication Networks

Figure 1:
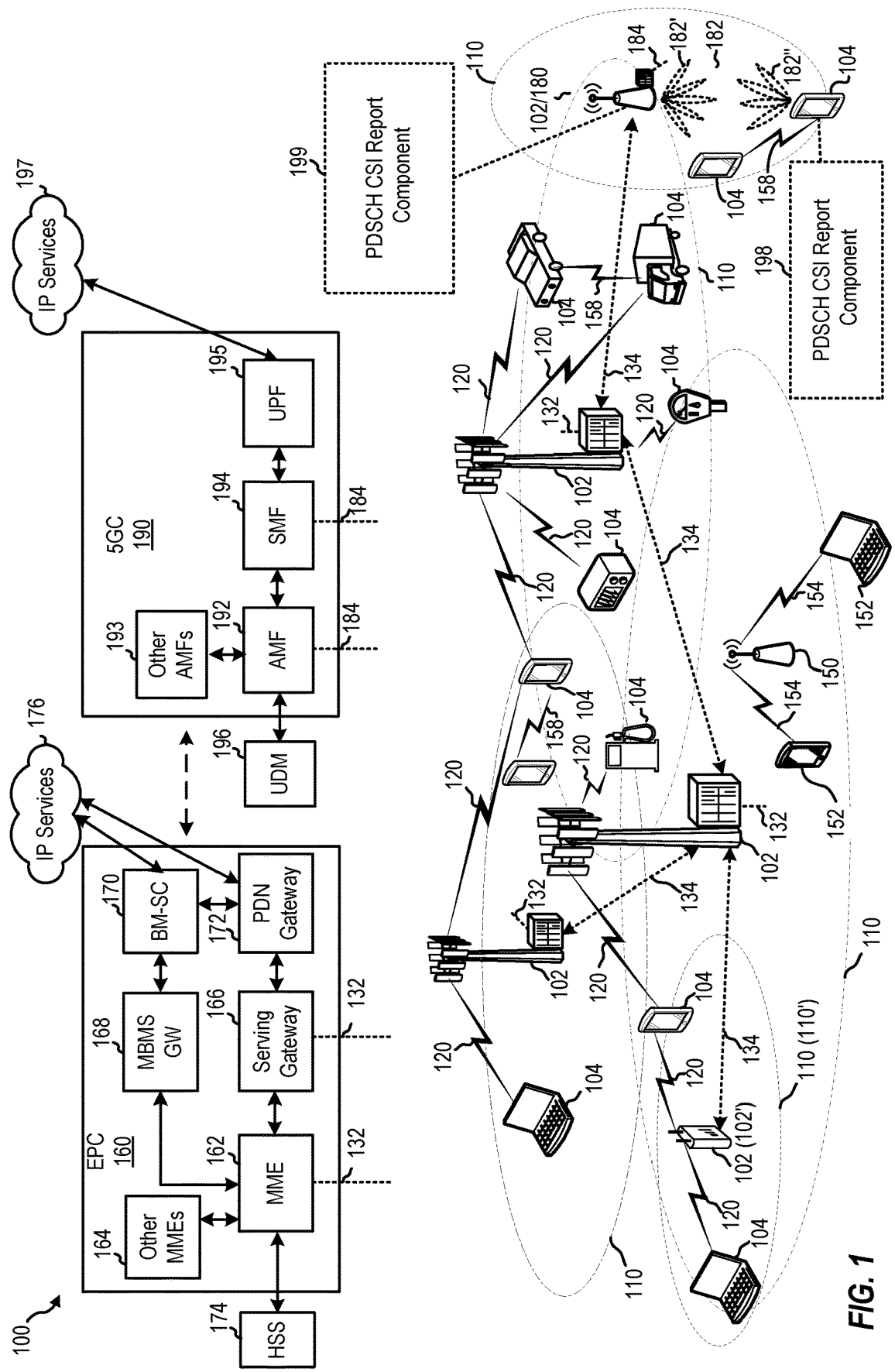
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from UE 104 to BS 102 and/or downlink (DL) (also referred to as forward link) transmissions from BS 102 to UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs (e.g., 180 in FIG. 1) may utilize beamforming 182 with UE 104 to improve path loss and range. For example, BS 180 and UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from BS 180 in one or more receive directions 182". UE 104 may also transmit a beamformed signal to BS 180 in one or more transmit directions 182"'. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

BS 102 includes PDSCH channel state information (CSI) report component 199, which may be configured to at least transmit a physical downlink shared channel (PDSCH) CSI report configuration to UE 104 (e.g., perform operations 500 of FIG. 5). UE 104 includes PDSCH CSI report component 198, which may be configured to at least generate and transmit a CSI report in accordance with the PDSCH CSI report configuration (e.g., perform operations 400 of FIG. 4).

Figure 2:
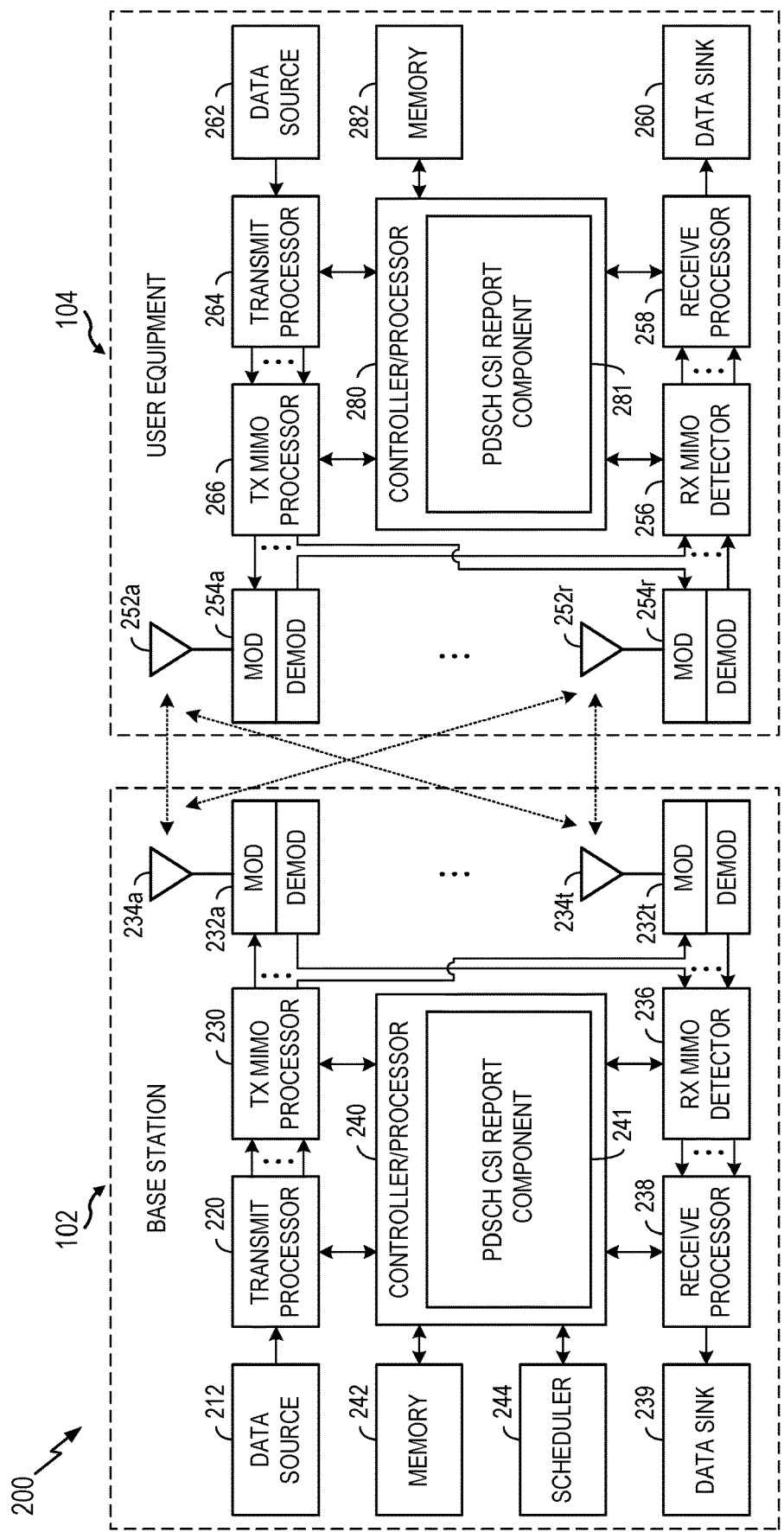
FIG. 2 is a block diagram conceptually illustrating aspects of an example of a base station (BS) and user equipment (UE).

FIG. 2 depicts aspects of an example BS 102 and UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes PDSCH CSI report component 241, which may be representative of PDSCH CSI report component 199 of FIG. 1. Notably, while depicted as an aspect of controller/processor 240, PDSCH CSI report component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes PDSCH CSI report component 281, which may be representative of PDSCH CSI report component 198 of FIG. 1. Notably, while depicted as an aspect of controller/processor 280, PDSCH CSI report component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5th generation (5G) (e.g., 5G new radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5th generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of HARQ Feedback

Communications between a user equipment (UE) and a network entity may include the use of feedback signaling. One form of feedback is hybrid automatic repeat request (HARQ) feedback. The HARQ feedback may be provided by a receiving device to a sending device, and may include the transmission of various reporting signals to the sending device. Example reporting signals may include acknowledgement (ACK) signals representing an ACK state, and negative acknowledgement (NAK) signals representing a NAK state. An ACK signal may be transmitted as part of HARQ feedback in response to successful reception and decoding of a data transmission. A NAK signal may be transmitted as part of HARQ feedback in response to a reception of a data transmission but an unsuccessful decoding of the data transmission.

In some cases, for each transport block (TB) of a physical downlink shared channel (PDSCH) transmission sent from a network entity to a UE, a UE provides multi-bits feedback (e.g., a turbo HARQ feedback). The turbo HARQ feedback may include more information, in addition to one bit ACK/NACK for the PDSCH (e.g., a regular HARQ feedback). The additional information may indicate a preferred modulation and coding scheme (MCS). In some aspects, the additional information include a delta MCS for the received TB (e.g., along with an MCS index). In some cases, the delta-MCS is calculated from a difference between a first MCS value (e.g., I_MCS_tgt) and a second MCS value (e.g., I_MCS). I_MCS_tgt is a largest MCS index such that estimated block error ratio (BLER) for the received TB with this MCS index is smaller than or equal to a BLER target. I_MCS is an MCS index of the received TB.

In one example, a turbo HARQ feedback (e.g., two bits feedback) may include ACK with a delta MCS of +X (where the TB was successfully received and +X delta MCS with respect to the MCS of a current PDSCH TB). In another example, a turbo HARQ feedback may include ACK with a delta MCS +0 (where the TB was successfully received and indicating delta MCS 0 with respect to the MCS of the current PDSCH TB). In another example, a turbo HARQ feedback may include NACK with a delta MCS −0 (where the TB was not successfully received and indicating delta MCS 0 with respect to MCS of a current PDSCH TB). In another example, a turbo HARQ feedback may include NACK with a delta MCS −Y (where the TB was not successfully received and indicating −Y delta MCS with respect to the MCS of the current PDSCB TB).

In some cases, a network entity uses information received via a turbo HARQ feedback to adjust the MCS (e.g., for a higher transmission efficiency). The information may include more than one bit of feedback indicating a desired MCS for a target BLER. The target BLER may depend on the MCS and a duplexing mode of the feedback transmission.

Aspects Related to Physical Downlink Shared Channel (PDSCH)-based Channel State Information (CSI)

Aspects of the present disclosure provide apparatuses, methods, processing systems, and computer-readable mediums for physical downlink shared channel (PDSCH)-based channel state information (CSI) reporting.

For example, techniques described herein relate to a report configuration for PDSCH-based CSI reporting. In some aspects, the PDSCH-based CSI report configuration is based on whether full duplex and/or half duplex (FD/HD) are configured. The techniques described herein provide for PDSCH-based CSI reporting for overlapping PDSCH transmissions. According to certain aspects, PDSCH-based CSI reports may be compressed across multiple PDSCH transmissions. According to certain aspects, overlapping and non-overlapping resources may be separately reported. A network entity may use a PDSCH-based CSI report from a user equipment (UE) to improve data transmission to the UE.

Figure 4:
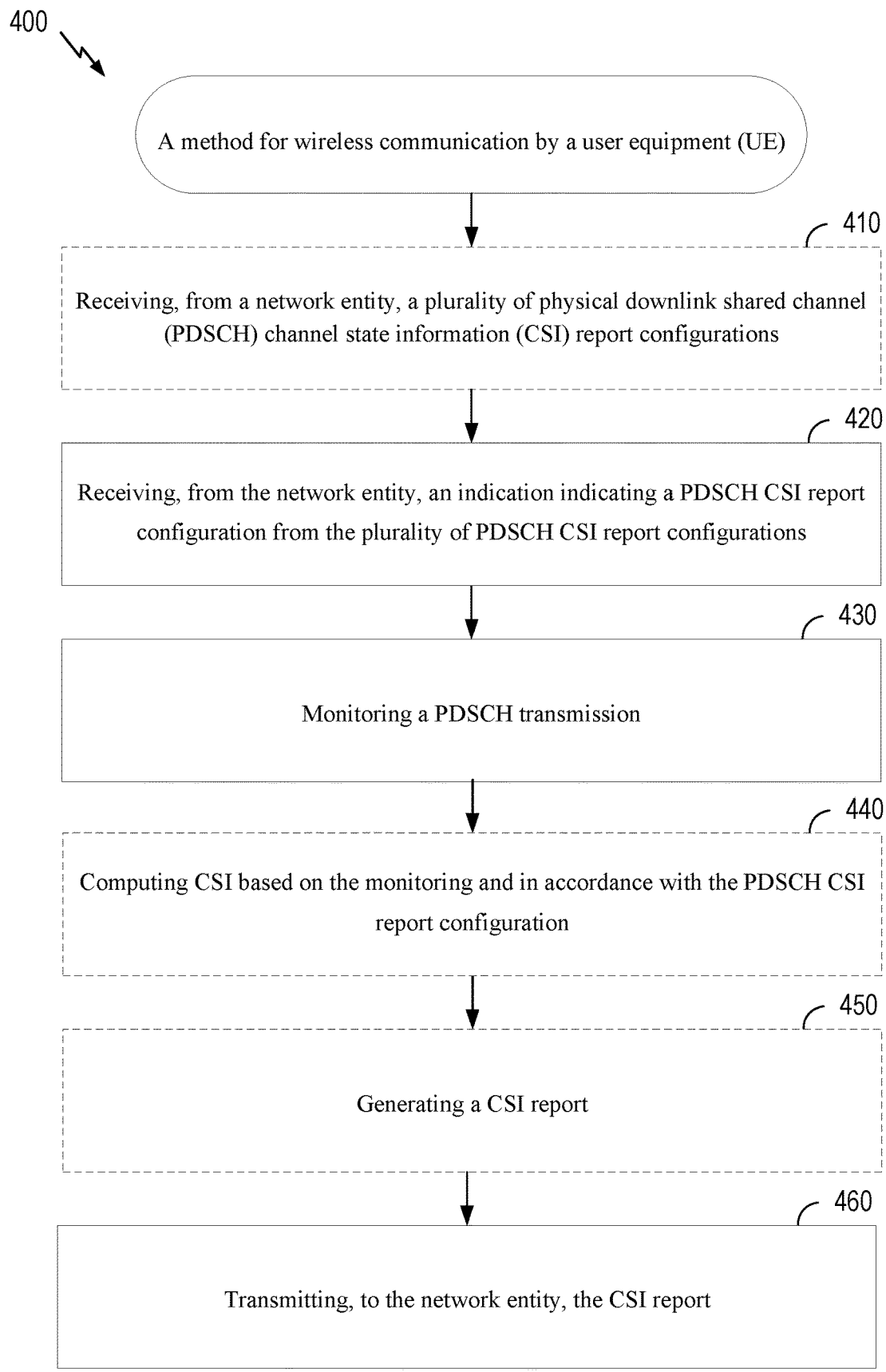
FIG. 4 is a flow diagram illustrating example operations for wireless communication by a UE.

FIG. 4 depicts a flow diagram illustrating example operations 400 for wireless communication. Operations 400 may be performed, for example, by a UE (e.g., such as UE 104 in wireless communication network 100 of FIG. 1). Operations 400 may be implemented as software components that are executed and run on one or more processors (e.g., controller/processor 280 of FIG. 2). Further, transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., the controller/processor 280) obtaining and/or outputting signals.

Operations 400 begin, at 410, by receiving a plurality of PDSCH CSI report configurations from a network entity. For example, the UE may receive the plurality of PDSCH CSI report configurations from the network entity using antenna (s) and/or receiver/transceiver components of UE 104 shown in FIG. 1 or FIG. 2 and/or of the apparatus shown in FIG. 8. In some examples, UE 104 receives the plurality of PDSCH CSI report configuration via radio resource control (RRC) signaling from BS 102. As discussed in more detail below, a PDSCH CSI report configuration may configure a set of parameters for reporting PDSCH CSI. Each PDSCH CSI report configurations may be associated with a configuration identifier (ID). In some examples, the PDSCH CSI report configurations are associated with half-duplex (HD) and full duplex (FD) mode configurations.

At 420, the UE receives an indication indicating a PDSCH CSI report configuration from the network entity. For example, the UE may receive the indication from the network entity using antenna(s) and/or receiver/transceiver components of UE 104 shown in FIG. 1 or FIG. 2 and/or of the apparatus shown in FIG. 8. In some examples, UE 104 receives medium access control (MAC) control element (CE) signaling activating a subset of the plurality of PDSCH CSI report configurations and receives downlink control information (DCI) indicating one of the activated PDSCH CSI report configurations. In some examples, the DCI explicitly indicates a PDSCH CSI report configuration ID. In some examples, the DCI schedules one or more PDSCH transmissions in one or more slots configured for HD and FD mode and the UE determines the PDSCH CSI report configuration based on the HD or FD mode in the slots.

At 430, the UE monitors a PDSCH transmission. For example, the UE may monitor the PDSCH transmission using a processor, antenna(s), and/or transceiver components of UE 104 shown in FIG. 1 or FIG. 2 and/or of the apparatus shown in FIG. 8. In some aspects, the UE monitors a PDSCH transmission scheduled by DCI or without DCI. In some examples, the UE monitors multiple PDSCH transmissions that may be on overlapping resources.

At 440, the UE may compute CSI based on the monitoring and in accordance with the PDSCH CSI report configuration. The UE may compute the CSI using a processor, antenna(s), and/or transceiver components of UE 104 shown in FIG. 1 or FIG. 2 and/or of the apparatus shown in FIG. 8.

At 450, the UE generates a CSI report based on the computed CSI. The UE may generate the CSI report using a processor, antenna(s), and/or transceiver components of the UE 104 shown in FIG. 1 or FIG. 2 and/or of the apparatus shown in FIG. 8. As discussed in more detail below, the UE may generate a compressed CSI report. In some examples, the UE generates a first report for non-overlapping PDSCH resources and a second report for overlapping PDSCH resources.

At 460, the UE transmits the CSI report to the network entity. The UE may transmit the CSI report to the network entity using antenna(s) and/or transmitter/transceiver components of UE 104 shown in FIG. 1 or FIG. 2 and/or of the apparatus shown in FIG. 8.

FIG. 5 is a flow diagram illustrating example operations 500 for wireless communication. The operations 500 may be performed, for example, by a network entity (e.g., such as BS 102 in wireless communication network 100 of FIG. 1). The operations 500 may be implemented as software components that are executed and run on one or more processors (e.g., controller/processor 240 of FIG. 2). Further, transmission and reception of signals by the network entity in operations 500 may be enabled, for example, by one or more antennas (e.g., antennas 234 of FIG. 2). In certain aspects, the transmission and/or reception of signals by the network entity may be implemented via a bus interface of one or more processors (e.g., the controller/processor 240) obtaining and/or outputting signals.

The operations 500 may begin, at 510, by transmitting, to a UE, a plurality of PDSCH CSI report configurations. For example, the network entity may transmit the plurality of PDSCH CSI report configurations to the UE using antenna(s) and transmitter/transceiver components of BS 102 shown in FIG. 1 or FIG. 2 and/or of the apparatus shown in FIG. 9.

At 520, the network entity transmits, to the UE, an indication indicating a PDSCH CSI report from the plurality of PDSCH CSI report configurations. For example, the network entity may transmit the indication to the UE using antenna(s) and transmitter/transceiver components of BS 102 shown in FIG. 1 or FIG. 2 and/or of the apparatus shown in FIG. 9.

At 530, the network entity transmits, to the UE, a PDSCH transmission. For example, the network entity may transmit the PDSCH transmission to the UE using antenna(s) and transmitter/transceiver components of BS 102 shown in FIG. 1 or FIG. 2 and/or of the apparatus shown in FIG. 9.

At 540, the network entity receives, from the UE, a CSI report based on the PDSCH transmission and in accordance with the PDSCH CSI report configuration. For example, the network entity may receive the CSI report from the UE using antenna(s) and transmitter/transceiver components of BS 102 shown in FIG. 1 or FIG. 2 and/or of the apparatus shown in FIG. 9.

Figure 6:
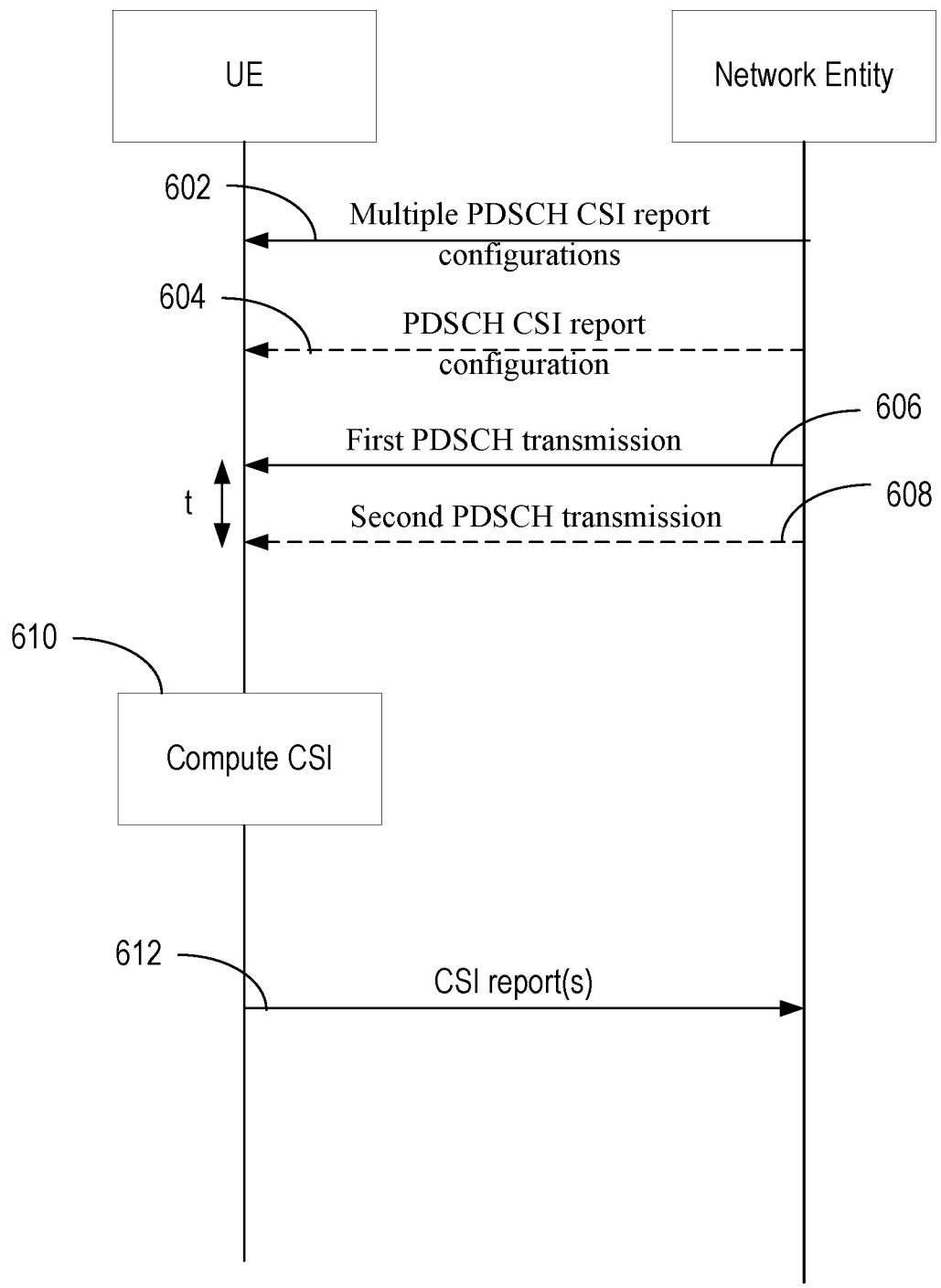
FIG. 6 is a call flow diagram illustrating example operations between a UE and a network entity.

The operations shown in FIGS. 4 and 5 may be understood with reference to the call flow diagram of FIG. 6.

As illustrated in FIG. 6, at 602, a network entity (e.g., the BS 102 shown in FIG. 1 or FIG. 2) sends multiple PDSCH CSI report configurations to a UE (e.g., the UE 104 shown in FIG. 1 or FIG. 2). For example, the network entity sends RRC signaling configuring the multiple PDSCH CSI report configurations to the UE.

In certain aspects, each PDSCH CSI report configuration is associated with a PDSCH report configuration ID. For example, a first PDSCH CSI report configuration is associated with a first PDSCH CSI report configuration ID and a second PDSCH CSI report configuration is associated with a second PDSCH CSI report configuration ID.

In certain aspects, two or more PDSCH CSI report configurations is associated with a PDSCH report configuration ID. For example, a first PDSCH CSI report configuration and a second PDSCH CSI report configuration is associated with a same PDSCH CSI report configuration ID.

In certain aspects, a PDSCH CSI report configuration ID is associated with a FD mode. In certain aspects, a PDSCH CSI report configuration ID is associated with a HD mode. In certain aspects, a PDSCH CSI report configuration ID is associated with a first set of parameters for an FD mode and a second set of parameters for an HD mode.

In certain aspects, a UE is configured using one or more PDSCH CSI report configurations to report a hybrid automatic repeat request (HARQ) acknowledgment (ACK) feedback in the PDSCH CSI report for a PDSCH transmission from a network entity. For example, the UE sends the HARQ feedback to the network entity, in response to the PDSCH transmission, based on the one or more PDSCH CSI report configurations.

In certain aspects, a UE is configured using one or more PDSCH CSI report configurations to report a modulation and coding scheme (MCS) adjustment parameter in the PDSCH CSI report. For example, the UE sends the MCS adjustment parameter to the network entity, based on the one or more PDSCH CSI report configurations.

In certain aspects, a PDSCH CSI report configuration may indicate a list of demodulation reference signal (DMRS) ports for measuring CSI (e.g., a UE may be configured with DMRS ports for rank adaptation). For example, the network entity may indicate to the UE, using the PDSCH CSI report configuration, a number of DMRS ports to use for CSI computation. The network entity may also indicate to the UE, using the PDSCH CSI report configuration, which DMRS ports to use for the CSI computation. In certain aspects, a PDSCH CSI report configuration may indicate a list of DMRS symbols for measuring CSI.

In certain aspects, a PDSCH CSI report configuration may indicate a type of a CSI report. In one example, the CSI report may correspond to a channel quality indicator (CQI) report. In another example, the CSI report may correspond to a CQI and rank indicator (RI) report. In certain aspects, a PDSCH CSI report configuration may indicate a type of CSI report granularity (e.g., a wideband (WB) or a subband (SB) based CSI report). In certain aspects, a PDSCH CSI report configuration may indicate a request to report CSI for each transport (TB). In certain aspects, a PDSCH CSI report configuration may indicate a request to report CSI for each code block group (CBG) within a TB.

In certain aspects, a PDSCH CSI report configuration may indicate a target block error ratio (BLER) for measuring CSI. In certain aspects, a PDSCH CSI report configuration may indicate a CQI table for measuring CSI. In certain aspects, a PDSCH CSI report configuration may indicate a CQI and MCS reference point (e.g., to compute a delta CQI and MCS relative to the CQI and MCS reference point). In certain aspects, a PDSCH CSI report configuration may indicate a number of bits for a delta MCS resolution.

In certain aspects, a PDSCH CSI report configuration may indicate a frequency domain bitmap for measuring CSI. In certain aspects, a PDSCH CSI report configuration may indicate an SB size for measuring CSI. In certain aspects, a PDSCH CSI report configuration may indicate a resolution of an SB size for measuring CSI (e.g., how many bits for SB CQI).

In certain aspects, a PDSCH CSI report configuration may indicate a request to report self-interference or not (e.g., for an FD mode). In certain aspects, a PDSCH CSI report configuration may indicate a request to report a preferred duplex mode.

In certain aspects, a network entity sends an indication to a UE indicating a subset of the multiple PDSCH CSI report configurations. For example, the network entity may send the indication to the UE indicating a selection of the subset of the multiple PDSCH CSI report configurations via a medium access control (MAC) control element (CE).

In certain aspects, a network entity configuration any combination of the above parameters in the PDSCH CSI report configurations.

At 604, a network entity sends an indication indicating a PDSCH CSI report configuration to the UE. For example, the network entity may send the indication to the UE indicating a selection of one of the subset of the plurality of the PDSCH CSI report configurations. The network entity may send this indication via DCI.

The PDSCH CSI report configuration is associated with a PDSCH report configuration ID. In certain aspects, the PDSCH CSI report configuration ID is associated with an FD mode. For example, the PDSCH CSI report configuration ID may be associated with a first set of parameters for an FD mode. The first set of parameters may indicate FD slots. In certain aspects, the PDSCH CSI report configuration ID is associated with an HD mode. For example, the PDSCH CSI report configuration ID may be associated with a second set of parameters for an HD mode. The second set of parameters may indicate HD slots.

At 606, a network entity sends a first PDSCH transmission to the UE.

At 608, a network entity may send a second PDSCH transmission to the UE. In one example, the network entity may sends the second PDSCH a time (t) from the first PDSCH transmission.

In certain aspects, the first and second PDSCH transmissions are on different resources (e.g., resource blocks (RBs)). In one example, the first and second PDSCH transmissions are on one or more overlapping resources. In another example, the first and second PDSCH transmissions are on one or more non-overlapping resources. In another example, the first and second PDSCH transmissions are on the overlapping resources and the non-overlapping resources.

At 610, a UE computes CSI based on the PDSCH transmission(s). For example, the UE may report the CSI for the first and second PDSCH transmissions, based on the PDSCH CSI report configuration.

In certain aspects, the UE generates a first CSI report for one or more non-overlapping resources. In certain aspects, the UE generates a second CSI report for one or more overlapping resources.

At 612, a UE transmits one or more CSI reports to the network entity. In one example, the one or more CSI reports may include a first CSI report. In another example, the one or more CSI reports may include a first and second CSI report.

In some aspects, the network indicates the PDSCH CSI report configuration ID in the DCI.

In certain aspects, a UE may determine a PDSCH CSI report is triggered (e.g., within a window of PDSCH transmissions) for one or more slots. In one example, the one or more slots may include HD slots. In another example, the one or more slots may include FD slots. The UE may then determine a PDSCH CSI report configuration ID to use for reporting PDSCH CSI based on whether the one or more slots are configured as FD or HD. In one example, when the one or more slots are configured as the FD, the UE may select a PDSCH CSI report configuration associated with FD mode. The UE may then calculate and report CSI, for a PDSCH, based on the selected PDSCH CSI report configuration associated with the FD mode. In another example, when the one or more slots are configured as the HD, the UE may select a PDSCH CSI report configuration associated with HD mode. The UE may then calculate and report CSI, for a PDSCH, based on the selected PDSCH CSI report configuration associated with the HD mode.

In some cases, a PDSCH CSI report configuration may be associated with both HD mode and FD mode (e.g., with different BLER). In such cases, a UE may report CSI, based on a current duplex mode. In some cases, a network entity may indicate to a UE (e.g., in DCI) that the UE may use a PDSCH CSI report configuration with an HD PDSCH or an FD PDSCH.

Figure 7:
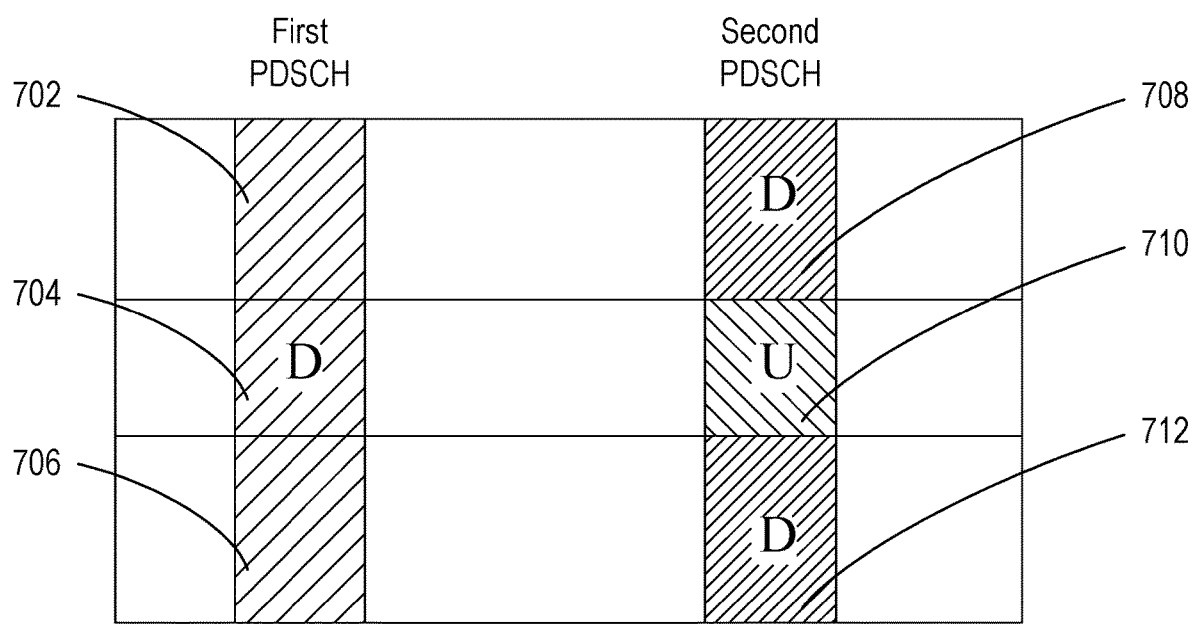
FIG. 7 illustrates example resources and physical downlink shared channel (PDSCH) transmissions.

As illustrated in FIG. 7, PDSCH transmissions may be overlapping (e.g., RBs 702, 708, 706, and 712) and non-overlapping RBs (RBs 704, 710). For example, the non-overlapping RBs CQI1 with RI1 is generated and signaled in separate CSI reports, and the overlapping RBs CQI2 with RI2 is reported in a same CSI report.

In certain aspects, to generate a second CSI report for one or more overlapping resources, a UE may compute a differential CSI. In one example, the differential CSI may include a worst CSI across first and second PDSCH transmissions for an HD slot and an FD slot (e.g., the worst CSI across the first and second PDSCH transmissions when a time difference between the first and second PDSCH transmissions is less than a threshold time configured via RRC or MAC-CE). In another example, the differential CSI may include a latest CSI across the first and second PDSCH transmissions (e.g. the UE may use a latest PDSCH transmission CSI when a time difference between the first and second PDSCH transmissions is more than a threshold time). In another example, the differential CSI may include an average CSI across the first and second PDSCH transmissions.

In certain aspects, a UE may determine to compute a differential CSI (e.g., to generate a second CSI report), when a demodulation reference signal (DMRS) of a first PDSCH transmission scheduled in an FD slot is configured with a quasi-colocation (QCL) relation with a reference signal (RS) and a DMRS of a second PDSCH transmission scheduled in an HD slot is configured with a QCL relation with the same RS. For example, a UE may determine to compute a differential CSI, based on QCL relation between a DMRS signal of each PDSCH and a RS. That is, if a DMRS of a PDSCH transmission in FD is QCL with an RS and a DMRS of a PDSCH transmission in HD is QCLed with a same RS, then a CSI report of these two PDSCH transmissions can be combined.

In certain aspects, a UE may determine to compute a differential CSI (e.g., to generate a second CSI report) when the first PDSCH transmission and the second PDSCH transmission are scheduled within the threshold time from each other.

In certain aspects, a rank indicator (RI) (e.g., RI=(RI1+RI2)/2) is a wideband. In certain aspects, a first channel quality indicator (CQI) in a first CSI report for non-overlapped resources and a second CQI for a second CSI report for overlapped resources may be separated. Based on the first CSI report and the second CSI report, a network entity may determine a signal to interference and noise ratio (SINR) difference between two resources. The SINR difference between the two resources may enable the network entity to set correct transmissions on a next HD PDSCH slot or a next FD PDSCH slot.

Example Wireless Communication Devices

Figure 8:
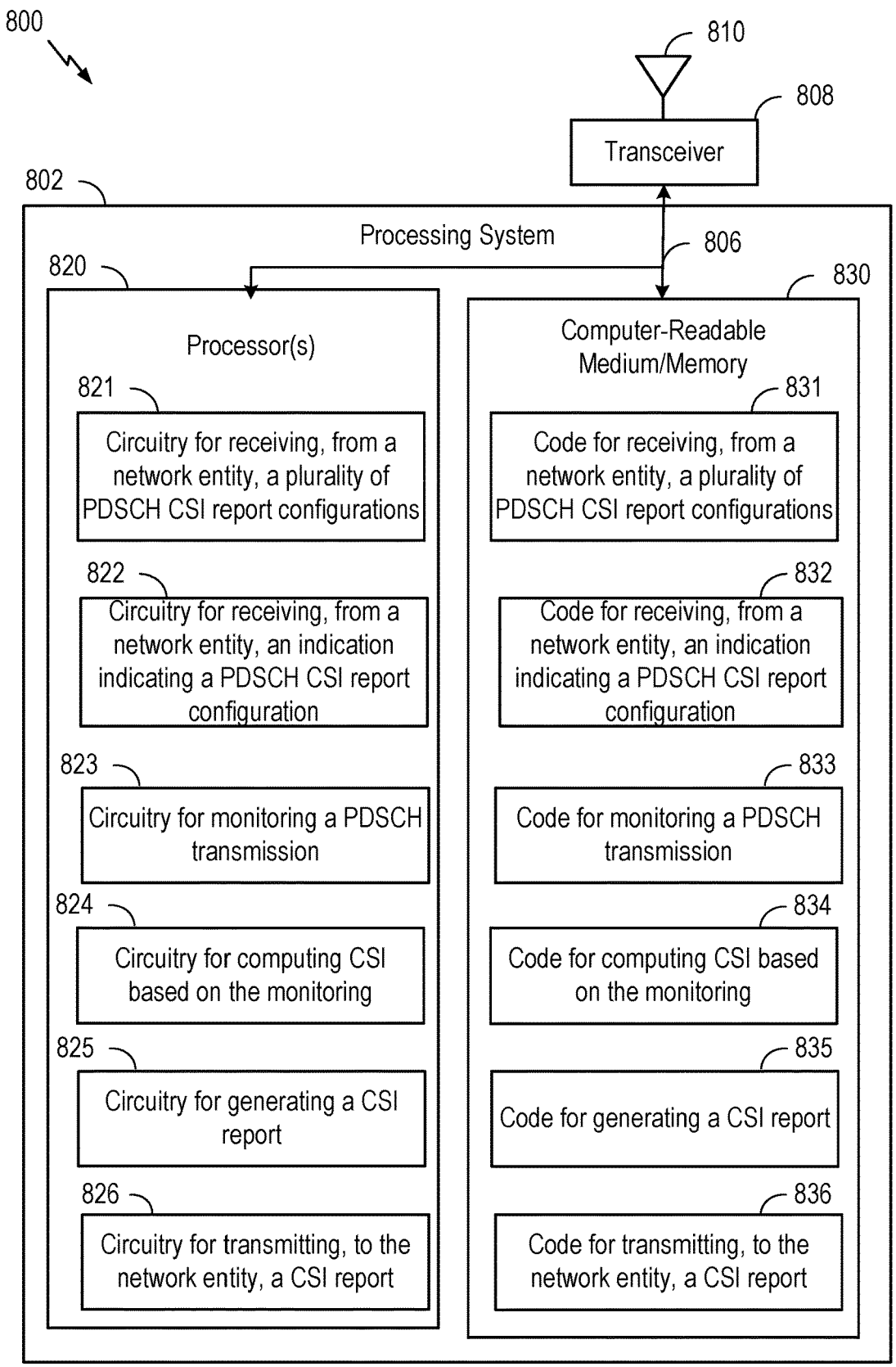
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 4. In some examples, communication device 800 may be a UE 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 4, or other operations for performing the various techniques discussed herein.

In the depicted example, computer-readable medium/memory 830 stores code 831 for receiving a plurality of CSI report configurations from a network entity, code 832 for receiving an indication indicating a CSI report configuration of the plurality of CSI report configurations from the network entity, code 833 for monitoring a PDSCH transmission, code 834 for computing CSI based on the monitoring, code 835 for generating a CSI report based on the computed CSI, and code 836 for transmitting a CSI report to the network entity.

In the depicted example, the one or more processors 820 include circuitry configured to implement the code stored in the computer-readable medium/memory 830, including circuitry 821 for receiving for receiving a plurality of CSI report configurations from a network entity, circuitry 822 for receiving an indication indicating a CSI report configuration of the plurality of CSI report configurations from the network entity, circuitry 823 for monitoring a PDSCH transmission, circuitry 824 for computing CSI based on the monitoring, circuitry 825 for generating, and circuitry 826 for transmitting a CSI report to the network entity.

Various components of communications device 800 may provide means for performing the methods described herein, including with respect to FIG. 4.

In some examples, means for transmitting or sending (or means for outputting for transmission) may include the transceivers 254 and/or antenna(s) 252 of the UE 104 illustrated in FIG. 2 and/or transceiver 808 and antenna 810 of the communication device 800 in FIG. 8.

In some examples, means for receiving (or means for obtaining) may include the transceivers 254 and/or antenna(s) 252 of UE 104 illustrated in FIG. 2 and/or transceiver 808 and antenna 810 of the communication device 800 in FIG. 8.

In some examples, means for receiving for receiving a plurality of CSI report configurations from a network entity, means for receiving an indication indicating a CSI report configuration of the plurality of CSI report configurations from the network entity, means for monitoring a PDSCH transmission, means for computing CSI based on the monitoring, means for generating, and means for transmitting a CSI report to the network entity, may include various processing system components, such as: the one or more processors 820 in FIG. 8, or aspects of UE 104 depicted in FIG. 2, including receive processor 258, transmit processor 264, TX MIMO processor 266, and/or controller/processor 280 (including PDSCH CSI report component 281).

Notably, FIG. 8 is an example, and many other examples and configurations of communication device 800 are possible.

Figure 9:
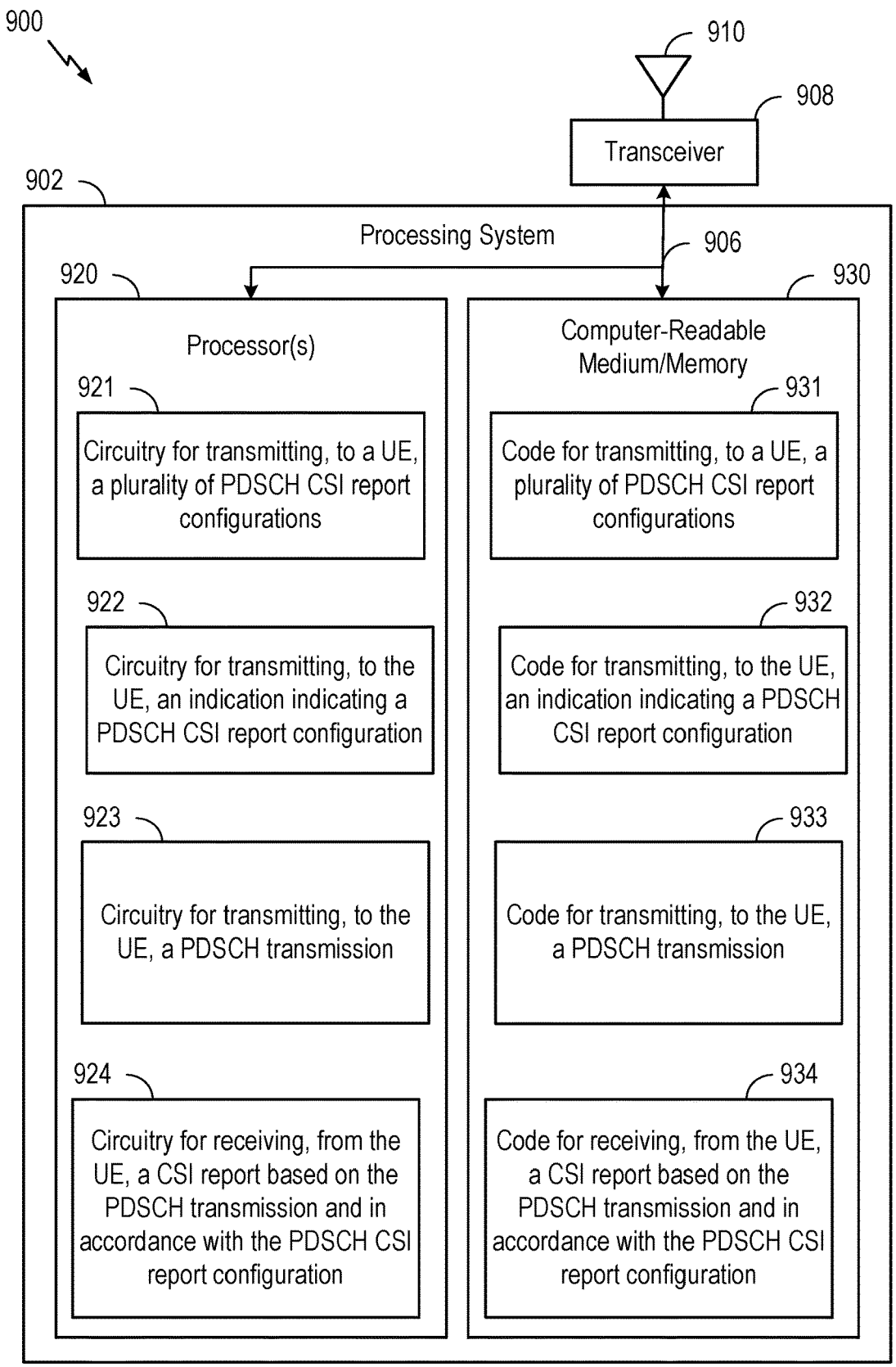
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 5. In some examples, communication device 900 may be a BS 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 5, or other operations for performing the various techniques discussed herein.

In the depicted example, computer-readable medium/memory 930 stores code 931 for transmitting a plurality of CSI report configurations to a UE, code 932 for transmitting an indication indicating a CSI report configuration of the plurality of CSI report configurations to the UE, code 933 for transmitting a PDSCH transmission to the UE, and code 934 for receiving a CSI report based on the PDSCH transmission and in accordance with the PDSCH CSI report configuration from the UE.

In the depicted example, the one or more processors 920 include circuitry configured to implement the code stored in the computer-readable medium/memory 930, including circuitry 921 for transmitting a plurality of CSI report configurations to a UE, circuitry 922 for transmitting an indication indicating a CSI report configuration of the plurality of CSI report configurations to the UE, circuitry 923 for transmitting a PDSCH transmission to the UE, and circuitry 924 for receiving a CSI report based on the PDSCH transmission and in accordance with the PDSCH CSI report configuration from the UE.

Various components of communications device 900 may provide means for performing the methods described herein, including with respect to FIG. 5.

In some examples, means for transmitting or sending (or means for outputting for transmission) may include the transceivers 232 and/or antenna(s) 234 of the BS 102 illustrated in FIG. 2 and/or transceiver 908 and antenna 910 of the communication device 900 in FIG. 9.

In some examples, means for receiving (or means for obtaining) may include the transceivers 232 and/or antenna(s) 234 of the BS illustrated in FIG. 2 and/or transceiver 908 and antenna 910 of the communication device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive multiple input multiple output (MIMO) processors, modulators, demodulators, and the like, such as depicted in the examples in FIG. 2.

In some examples, means for transmitting a plurality of CSI report configurations to a UE, means for transmitting an indication indicating a CSI report configuration of the plurality of CSI report configurations to the UE, means for transmitting a PDSCH transmission to the UE, and means for receiving a CSI report based on the PDSCH transmission and in accordance with the PDSCH CSI report configuration from the UE, may include various processing system components, such as: the one or more processors 920 in FIG. 9, or aspects of the BS 102 depicted in FIG. 2, including receive processor 238, transmit processor 220, TX MIMO processor 230, and/or controller/processor 240 (including PDSCH CSI report component 241).

Notably, FIG. 9 is an example, and many other examples and configurations of communication device 900 are possible.

Example Clauses

Implementation examples are described in the following numbered clauses:

Clause 1: A method for wireless communication by a user equipment (UE), comprising: receiving, from a network entity, a physical downlink shared channel (PDSCH) channel state information (CSI) report configuration; monitoring a PDSCH transmission; and transmitting, to the network entity, a CSI report based on the monitoring and in accordance with the PDSCH CSI report configuration.

Clause 2: The method alone or in combination with the first clause, wherein the PDSCH CSI report configuration configures the UE to report at least hybrid automatic repeat request (HARM) acknowledgment (ACK) feedback for the PDSCH transmission and a modulation and coding scheme (MCS) adjustment parameter.

Clause 3: The method alone or in combination with one or more of the first and second clauses, wherein the PDSCH CSI report configuration is associated with a PDSCH CSI report configuration identifier (ID).

Clause 4: The method alone or in combination with one or more of the first through third clauses, further comprising receiving signaling, from the network entity, configuring a plurality of PDSCH CSI report configurations and, for each PDSCH CSI report configuration, an associated PDSCH report configuration identifier (ID).

Clause 5: The method alone or in combination with one or more of the first through fourth clauses, wherein the PDSCH CSI report configuration indicates one or more of: a list of demodulation reference signal (DMRS) ports for measuring CSI; and a list of DMRS symbols for measuring the CSI.

Clause 6: The method alone or in combination with one or more of the first through fifth clauses, wherein the PDSCH CSI report configuration indicates one or more of: a type of the CSI report; a type of CSI report granularity; a request to report CSI for each transport (TB); and a request to report the CSI for each code block group (CBG) within a TB.

Clause 7: The method alone or in combination with one or more of the first through sixth clauses, wherein the PDSCH CSI report configuration indicates one or more of: a target block error ratio (BLER) for measuring CSI; a channel quality indicator (CQI) table for measuring the CSI; a CQI and modulation and coding scheme (MCS) reference point to compute a delta CQI and MCS relative to the CQI and MCS reference point; and a number of bits for a delta MCS resolution.

Clause 8: The method alone or in combination with one or more of the first through seventh clauses, wherein the PDSCH CSI report configuration indicates one or more of: a frequency domain bitmap for measuring CSI; a subband (SB) size for measuring the CSI; and a resolution of the SB size for measuring the CSI.

Clause 9: The method alone or in combination with one or more of the first through eighth clauses, wherein the PDSCH CSI report configuration indicates one or more of: a request to report self-interference or not for a full-duplex (FD) mode; and a request to report a preferred duplex mode.

Clause 10: The method alone or in combination with one or more of the first through ninth clauses, wherein the PDSCH CSI report configuration ID is associated with either a full-duplex (FD) mode or a half-duplex (HD) mode.

Clause 11: The method alone or in combination with one or more of the first through tenth clauses, determining a PDSCH CSI report is triggered for one or more slots; and determining the PDSCH CSI report configuration ID to use for reporting PDSCH CSI based on whether the one or more slots are configured as FD or HD.

Clause 12: The method alone or in combination with one or more of the first through eleventh clauses, wherein the PDSCH CSI report configuration ID is associated with a first set of parameters for a full-duplex (FD) mode and a second set of parameters for a half-duplex (HD) mode.

Clause 13: The method alone or in combination with one or more of the first through twelfth clauses, wherein receiving the PDSCH CSI report configuration comprises: receiving radio resource control (RRC) signaling configuring a plurality of PDSCH CSI report configurations; receiving a medium access control (MAC) control element (CE) indicating a subset of the plurality of PDSCH CSI report configurations; and receiving downlink control information (DCI) indicating one of the subset of the plurality of the PDSCH CSI report configurations.

Clause 14: The method alone or in combination with one or more of the first through thirteenth clauses, further comprising: determining to report CSI for a first PDSCH transmission and a second PDSCH transmission, wherein the first and second PDSCH transmissions are on one or more overlapping resources and one or more non-overlapping resources.

Clause 15: The method alone or in combination with one or more of the first through fourteenth clauses, wherein transmitting the CSI report comprises: generating a first CSI report for one or more non-overlapping resources and a second CSI report for the one or more overlapping resources; and transmitting the first and second CSI reports.

Clause 16: The method alone or in combination with one or more of the first through fifteenth clauses, wherein generating the second CSI report for the one or more overlapping resources comprises: computing a differential CSI, wherein the differential CSI comprises a worst CSI across the first and second PDSCH transmissions for a half-duplex (HD) slot and a full-duplex (FD) slot, a latest CSI across the first and second PDSCH transmissions, or an average CSI across the first and second PDSCH transmissions.

Clause 17: The method alone or in combination with one or more of the first through sixteenth clauses, wherein computing the differential CSI to generate the second CSI report is based on a determination that a demodulation reference signal (DMRS) of a PDSCH transmission scheduled in an FD slot is configured with a quasi-colocation (QCL) relation with a reference signal (RS) and a DMRS of a second PDSCH transmission scheduled in an HD slot is configured with a QCL relation with the same RS.

Clause 18: The method alone or in combination with one or more of the first through seventeenth clauses, wherein computing the differential CSI to generate the second CSI report is based on a determination that the first PDSCH transmission and the second PDSCH transmission are scheduled within a threshold time from each other.

Clause 19: The method alone or in combination with one or more of the first through eighteenth clauses, wherein a rank indicator (RI) is a wideband, and wherein a first channel quality indicator (CQI) in the first CSI report for the non-overlapped resources and a second CQI for the second CSI report for the overlapped resources are separated.

Clause 20: A method for wireless communication by a network entity, comprising: transmitting, to a user equipment (UE), a physical downlink shared channel (PDSCH) channel state information (CSI) report configuration; transmitting, to the UE, a PDSCH transmission; and receiving, from the UE, a CSI report based on the PDSCH transmission and in accordance with the PDSCH CSI report configuration.

Clause 21: The method alone or in combination with the twentieth clause, wherein the PDSCH CSI report configuration is associated with a PDSCH CSI report configuration identifier (ID).

Clause 22: The method alone or in combination with one or more of the twentieth and twenty-first clauses, further comprising transmitting signaling, to the UE, configuring a plurality of PDSCH CSI report configurations and, for each PDSCH CSI report configuration, an associated PDSCH report configuration identifier (ID).

Clause 23: The method alone or in combination with one or more of the twentieth through twenty-second clauses, wherein the PDSCH CSI report configuration indicates one or more of: a list of demodulation reference signal (DMRS) ports for measuring CSI; and a list of DMRS symbols for measuring the CSI.

Clause 24: The method alone or in combination with one or more of the twentieth through twenty-third clauses, wherein the PDSCH CSI report configuration ID is associated with either a full-duplex (FD) mode or a half-duplex (HD) mode.

Clause 25: The method alone or in combination with one or more of the twentieth through twenty-fourth clauses, wherein transmitting the PDSCH CSI report configuration comprises: transmitting radio resource control (RRC) signaling configuring a plurality of PDSCH CSI report configurations; transmitting a medium access control (MAC) control element (CE) indicating a subset of the plurality of PDSCH CSI report configurations; and transmitting downlink control information (DCI) indicating one of the subset of the plurality of the PDSCH CSI report configurations.

Clause 26: An apparatus, comprising: a memory comprising executable instructions; one or more processors configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by one or more processors of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When BS 180 operates in mmWave or near mmWave frequencies, the BS 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at BS. UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by BS for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of physical downlink shared channel (PDSCH)-based channel state information (CSI) in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication by a user equipment (UE), comprising:
   receiving, from a network entity, a physical downlink shared channel (PDSCH) channel state information (CSI) report configuration;
   monitoring a PDSCH transmission; and
   transmitting, to the network entity, a CSI report based on the monitoring and in accordance with the PDSCH CSI report configuration;
   wherein the PDSCH CSI report configuration is associated with a PDSCH CSI report configuration identifier (ID);
   wherein the PDSCH CSI report configuration ID is associated with either a full-duplex (FD) mode or a half-duplex (HD) mode.

2. The method of claim 1, wherein the PDSCH CSI report configuration configures the UE to report at least hybrid automatic repeat request (HARD) acknowledgment (ACK) feedback for the PDSCH transmission and a modulation and coding scheme (MCS) adjustment parameter.

3. The method of claim 1, further comprising receiving signaling, from the network entity, configuring a plurality of PDSCH CSI report configurations and, for each PDSCH CSI report configuration, an associated PDSCH report configuration identifier (ID).

4. The method of claim 1, wherein the PDSCH CSI report configuration indicates one or more of:
   a list of demodulation reference signal (DMRS) ports for measuring CSI; and
   a list of DMRS symbols for measuring the CSI.

5. The method of claim 1, wherein the PDSCH CSI report configuration indicates one or more of:
   a type of the CSI report;
   a type of CSI report granularity;
   a request to report CSI for each transport (TB); and
   a request to report the CSI for each code block group (CBG) within a TB.

6. The method of claim 1, wherein the PDSCH CSI report configuration indicates one or more of:
   a target block error ratio (BLER) for measuring CSI;
   a channel quality indicator (CQI) table for measuring the CSI;
   a CQI and modulation and coding scheme (MCS) reference point to compute a delta CQI and MCS relative to the CQI and MCS reference point; and
   a number of bits for a delta MCS resolution.

7. The method of claim 1, wherein the PDSCH CSI report configuration indicates one or more of:
   a frequency domain bitmap for measuring CSI;
   a subband (SB) size for measuring the CSI; and
   a resolution of the SB size for measuring the CSI.

8. The method of claim 1, further comprising:
   determining a PDSCH CSI report is triggered for one or more slots; and
   determining the PDSCH CSI report configuration ID to use for reporting PDSCH CSI based on whether the one or more slots are configured as FD or HD.

9. The method of claim 1, wherein the PDSCH CSI report configuration ID is associated with a first set of parameters for the full-duplex (FD) mode and a second set of parameters for the half-duplex (HD) mode.

10. The method of claim 1, wherein receiving the PDSCH CSI report configuration comprises:
    receiving radio resource control (RRC) signaling configuring a plurality of PDSCH CSI report configurations;
    receiving a medium access control (MAC) control element (CE) indicating a subset of the plurality of PDSCH CSI report configurations; and
    receiving downlink control information (DCI) indicating one of the subset of the plurality of the PDSCH CSI report configurations.

11. The method of claim 1, wherein transmitting the PDSCH CSI report configuration comprises:
    transmitting radio resource control (RRC) signaling configuring a plurality of PDSCH CSI report configurations;
    transmitting a medium access control (MAC) control element (CE) indicating a subset of the plurality of PDSCH CSI report configurations; and
    transmitting downlink control information (DCI) indicating one of the subset of the plurality of the PDSCH CSI report configurations.

12. A method for wireless communication by a user equipment (UE), comprising:
    receiving, from a network entity, a physical downlink shared channel (PDSCH) channel state information (CSI) report configuration;
    monitoring a PDSCH transmission; and
    transmitting, to the network entity, a CSI report based on the monitoring and in accordance with the PDSCH CSI report configuration,
    wherein the PDSCH CSI report configuration indicates one or more of:

a request to report self-interference or not for a full-duplex (FD) mode; and
a request to report a preferred duplex mode.

13. A method for wireless communication by a user equipment (UE), comprising:
receiving, from a network entity, a physical downlink shared channel (PDSCH) channel state information (CSI) report configuration;
monitoring a PDSCH transmission;
transmitting, to the network entity, a CSI report based on the monitoring and in accordance with the PDSCH CSI report configuration; and
determining to report CSI for a first PDSCH transmission and a second PDSCH transmission, wherein the first and second PDSCH transmissions are on one or more overlapping resources and one or more non-overlapping resources.

14. A method for wireless communication by a user equipment (UE), comprising:
receiving, from a network entity, a physical downlink shared channel (PDSCH) channel state information (CSI) report configuration;
monitoring a PDSCH transmission; and
transmitting, to the network entity, a CSI report based on the monitoring and in accordance with the PDSCH CSI report configuration,
wherein transmitting the CSI report comprises:
generating a first CSI report for one or more non-overlapping resources and a second CSI report for the one or more overlapping resources; and
transmitting the first and second CSI reports.

15. The method of claim 14, wherein generating the second CSI report for the one or more overlapping resources comprises:
computing a differential CSI, wherein the differential CSI comprises a worst CSI across the first and second PDSCH transmissions for a half-duplex (HD) slot and a full-duplex (FD) slot, a latest CSI across the first and second PDSCH transmissions, or an average CSI across the first and second PDSCH transmissions.

16. The method of claim 15, wherein computing the differential CSI to generate the second CSI report is based on a determination that a demodulation reference signal (DMRS) of a PDSCH transmission scheduled in an FD slot is configured with a quasi-colocation (QCL) relation with a reference signal (RS) and a DMRS of a second PDSCH transmission scheduled in an HD slot is configured with a QCL relation with the same RS.

17. The method of claim 15, wherein computing the differential CSI to generate the second CSI report is based on a determination that the first PDSCH transmission and the second PDSCH transmission are scheduled within a threshold time from each other.

18. The method of claim 14, wherein a rank indicator (RI) is a wideband, and wherein a first channel quality indicator (CQI) in the first CSI report for the non-overlapped resources and a second CQI for the second CSI report for the overlapped resources are separated.

19. A method for wireless communication by a network entity, comprising:
transmitting, to a user equipment (UE), a physical downlink shared channel (PDSCH) channel state information (CSI) report configuration;
transmitting, to the UE, a PDSCH transmission; and
receiving, from the UE, a CSI report based on the PDSCH transmission and in accordance with the PDSCH CSI report configuration;
wherein the PDSCH CSI report configuration is associated with a PDSCH CSI report configuration identifier (ID);
wherein the PDSCH CSI report configuration ID is associated with either a full-duplex (FD) mode or a half-duplex (HD) mode.

20. The method of claim 19, further comprising transmitting signaling, to the UE, configuring a plurality of PDSCH CSI report configurations and, for each PDSCH CSI report configuration, an associated PDSCH report configuration identifier (ID).

21. The method of claim 19, wherein the PDSCH CSI report configuration indicates one or more of:
a list of demodulation reference signal (DMRS) ports for measuring CSI; and
a list of DMRS symbols for measuring the CSI.

22. An apparatus for wireless communication by a user equipment (UE), comprising:
one or more processors and one or more memories configured to:
receive, from a network entity, a physical downlink shared channel (PDSCH) channel state information (CSI) report configuration;
monitor a PDSCH transmission; and
transmit, to the network entity, a CSI report based on the monitoring and in accordance with the PDSCH CSI report configuration;
wherein the PDSCH CSI report configuration is associated with a PDSCH CSI report configuration identifier (ID);
wherein the PDSCH CSI report configuration ID is associated with either a full-duplex (FD) mode or a half-duplex (HD) mode.

23. The apparatus of claim 22, wherein the PDSCH CSI report configuration configures the UE to report at least hybrid automatic repeat request (HARD) acknowledgment (ACK) feedback for the PDSCH transmission and a modulation and coding scheme (MCS) adjustment parameter.

24. An apparatus for wireless communication by a network entity, comprising:
one or more processors and one or more memories configured to:
transmit, to a user equipment (UE), a physical downlink shared channel (PDSCH) channel state information (CSI) report configuration;
transmit, to the UE, a PDSCH transmission; and
receive, from the UE, a CSI report based on the PDSCH transmission and in accordance with the PDSCH CSI report configuration;
wherein the PDSCH CSI report configuration is associated with a PDSCH CSI report configuration identifier (ID);
wherein the PDSCH CSI report configuration ID is associated with either a full-duplex (FD) mode or a half-duplex (HD) mode.

25. The apparatus of claim 24, wherein the PDSCH CSI report configuration indicates one or more of:
a list of demodulation reference signal (DMRS) ports for measuring CSI; and
a list of DMRS symbols for measuring the CSI.

* * * * *